Patented Nov. 12, 1940

2,220,966

UNITED STATES PATENT OFFICE 2,220,966

TITANIUM OXIDE SUSPENSIONS

Ignace J. Krchma, Wilmington, Del., assignor to E. I. du Pont de Nemours & Company, Wilmington, Del., a corporation of Delaware No Drawing. Application July 16, 1938, Serial No. 219,601

13 Claims. (Cl. 134—58)

This invention relates to the production of titanium oxide suspensions. More particularly it relates to an improved method of preparing colloidal aqueous suspensions of titanium oxide using monobasic oxygen containing acids or salts thereof as peptizing agents, and the production from said suspensions of high quality titanium oxide pigments.

A number of processes for the preparation of titanium oxide in aqueous colloidal suspensions have been proposed and practiced in the prior art. Thus, a process using hydrochloric acid as a peptizing agent has been employed in the past. Such a process, however, presents many disadvantages. One of the disadvantages resulting from the use of hydrochloric acid as a peptizing agent is the formation of extremely stable sols. Obviously, the sols stability limits the condition of recoagulation since the extremely fine particles existing in the peptized state are entirely unsatisfactory for pigment purposes. Another disadvantage resulting from the use of hydrochloric acid as a peptizing agent is the corrosive action of the colloidal suspension attributed to the presence of said acid in a dilute condition. This acid is especially troublesome when the resulting suspension is used in an operation comprising drying and calcination. The colloidal suspension is usually evaporated and dried when used commercially and it is, therefore, extremely important that the acid employed in the peptization be as non-corrosive as possible in order that the corrosion of the equipment by the acid fumes will be reduced to a minimum. This corrosion not only decreases to a considerable extent the life of the ferrous equipment used but further, it causes an impairment of the quality due to the contamination with ferric chloride. Further, the use of non-ferrous corrosion resisting equipment is economically impractical due to the large installation cost.

This invention has as an object an improved process for the preparation of aqueous dispersions of titanium dioxide. A further object is a process for the production of acid dispersed titanium dioxide in an exceedingly fine state of subdivision. A still further object is a process for the production of colloidal suspensions of titanium dioxide wherein a peptizing agent which can be easily transformed to a nondispersing chemical is employed, thereby coagulating the dispersion. A still further object is the production of pigments by a process involving peptization of titanium dioxide and subsequent coagulation of the suspension by decomposing the dispersing agent, thereby producing a composition which readily calcines to a titanium pigment of high quality. Additional objects will become apparent from an examination of the following description and claims.

These objects are attained by the herein described invention which broadly comprises peptizing a titanium pigment with an oxygen containing monobasic compound, and thereafter coagulating the resulting colloidal solution. In a more restricted sense this invention comprises peptizing titanium oxide with an oxygen containing acid or salt thereof and thereafter coagulating the resulting colloidal solution by decomposing the dispersing agent employed therein. The preferred embodiment of this invention comprises peptizing titanium dioxide with an oxygen containing acid or salt of the halogen group, preferably sulfamic acid or barium sulfamate. The resulting colloidal solution is thereafter coagulated by decomposing either by the application of heat or by the addition thereto of a reducing agent.

In one representative embodiment of this invention the peptizing agent, such as a barium salt of an oxygen containing monobasic acid, is added to a titanium dioxide raw pigment, said pigment may be one obtained by methods well known in the art, such as by hydrolyzing a solution of ilmenite in sulfuric acid. The amount of barium salt added is substantially equivalent to the amount of absorbed sulfuric acid in the raw titanium dioxide pigment. Upon admixture, the barium salt reacts with the absorbed sulfuric acid thereby producing barium sulfate and an oxygen containing monobasic acid which in turn acts as a peptizing agent causing the titanium dioxide to be finely divided and colloidally dispersed. In another representative embodiment I may start with a pigment in the form of a filter cake, such as one containing about 30% $TiO_2$, and add thereto a concentrated solution of a barium salt, such as barium chlorate, the filter cake after such addition immediately turning into a fluid suspension, the solids at this time being colloidal. This dispersion is perfectly stable and remains as such over a long period of time. In still another representative embodiment of this invention I may add a solution of an oxygen containing halogen acid to a sulfate free titanium oxide hydrolyzate. The titanium oxide is dispersed upon such addition and this dispersion is also stable over a long period of time. It is to be understood that the aforementioned embodiments are merely representative and are not exclusive.

I have found that the titanium pigment employed in accordance with my hereindescribed invention should be substantially free of color imparting impurities and substantially free of coagulating electrolytes such as sulfuric acid, oxalic acid, phosphoric acids and the salts of these acids as well as other polybasic acids.

The amount of peptizing agent which is added or which is present during the peptization depends upon the character of the titanium pigment selected for use as well as the concentration of the titanium oxide in the suspension being dispersed. Generally, however, the amount of agent used is between about 0.5% to about 20%, i. e., about 0.5 gram to about 20 grams per 100 grams of pigment. In the case of a dilute suspension I have found it desirable to use an amount in the upper portion of aforesaid range, for example, between about 11 grams to about 20 grams of agent per 100 grams of $TiO_2$. In a concentrated suspension I have found it desirable to use an amount of agent between about 1 gram to about 10 grams per 100 grams of $TiO_2$, preferably between about 2 grams to about 5 grams. Suspensions containing as high as between about 400 grams to about 500 grams of $TiO_2$ per liter may be readily prepared.

Sulfamic acid and barium sulfamate are the preferred agents because of the superior results obtained by their use. I have found it desirable to use barium sulfamate when a sulfuric acid containing raw pigment is used in my process. If the sulfuric acid is first neutralized and the soluble sulfate then removed by filtration or washing, I have found it desirable to use sulfamic acid itself. The same is true if the sulfuric acid is rendered inactive by precipitation.

Another advantageous property of the aforesaid sulfamic acid and barium sulfamate is the fact that they can be easily decomposed without the addition of further chemicals by simple rearrangement of the molecules by proper heat treatment. Thus, they may be readily decomposed in the colloidal solution by heating said solution to a temperature above 80° C. and preferably between about 80° C. and the boiling point of the solution. At such a temperature it decomposes into ammonium bisulfate. The ammonium bisulfate resulting from the decomposition acts as a coagulating agent in the same manner as sulfuric acid, and only a partial decomposition is necessary in order that the titanium oxide suspension may be thoroughly coagulated and put into a filterable condition.

However, it must be understood that greatly improved results are produced by the use of other oxygen containing monobasic compounds. Thus, such monobasic oxygen containing acids as chloric, bromic, iodic, perchloric, perbromic, periodic, may be used in the herein described invention. Of these peptizing agents, chloric and perchloric acids are preferred. These acids are likewise easily decomposed by the use of suitable chemical reagents. It is desirable that the reagents selected for this decomposition are of the reducing type. The reducing agent reduces the monobasic oxygen containing acid thereby eliminating the peptizing agent from the colloidal suspension, thereby coagulating the material. Titanous sulfate and other similar reducing agents are suitable for destroying the suspension. It is to be appreciated that these acids require a reducing agent for the decomposition whereas, as stated above, sulfamic acid is readily decomposed by proper heat treatment.

The following examples are given for illustrative purposes and are not intended to place any restrictions or limitations on the herein described invention.

Example I

A washed iron free hydrolysate obtained from the hydrolysis of commercial titanium solutions was neutralized with ammonium hydroxide and washed to remove the ammonium sulfate. The resulting filter cake comprising 100 parts of titanium oxide and 250 parts of water, was treated by addition of a solution containing 3 parts of sulfamic acid. Upon agitation adequate to thoroughly incorporate the acid into the titanium oxide cake, a dispersed or peptized suspension of finely divided titanium oxide resulted. This suspension was stable and no settling out of the suspended particles occurred. Upon heating the solution to a temperature in excess of about 80° C., coagulation was effected due to the chemical transformation of the sulfamic acid into ammonium bisulfate.

Example II

The operations of Example I were repeated except that perchloric acid was used as the dispersing or peptizing agent. The dispersion was likewise stable over long periods of time.

Example III

Titanium oxide hydrolysate in the form of a wash filter cake containing 8 parts of absorbed or combinted $H_2SO_4$ per 100 parts of $TiO_2$ was treated with barium sulfamate in aqueous solution, the amount employed being sufficient to precipitate all of the $H_2SO_4$ as blanc fixe. The freed sulfamic acid dispersed the titanium oxide giving a suspension similar to that described in Example I. Upon heating the dispersed suspension to the boiling point and calcining the coagulated material, a product containing 16% $BaSO_4$ and 84% $TiO_2$ was obtained.

Example IV

The process of Example III was repeated except that 214 parts of separately prepared blanc fixe were added for each 100 parts of $TiO_2$ just prior to the coagulation by heat. The product was calcined at about 900° C. and was found to be an excellent pigment comprising 30% $TiO_2$ and 70% $BaSO_4$.

Example V

A suspension of colloidally dispersed titanium oxide was prepared as in Example I and blended with a slurry of freshly precipitated anhydrite in the proportions of 240 parts of $CaSO_4$ per 100 parts of $TiO_2$. The admixture was then heated and the coagulated mass dried, calcined, and tested for pigment properties. The resulting white titanium pigment was analyzed and found to comprise about 30% $TiO_2$ and about 70% $CaSO_4$.

While the above examples are limited to the use of hydrolyzed titanium oxide, it is understood that said examples are merely illustrative and my invention is not limited thereto. For example, I may also employ calcined titanium oxide and disperse said pigment with the reagent, although this is not my preferred procedure. Also, I may peptize a mixture comprising titanium oxide and extenders such as a mixture of titanium oxide and blanc fixe. In that event, I will have a colloidally dispersed titanium oxide along with colloidally dispersed blanc fixe. If the titanium oxide has been freshly precipitated and is uncalcined, the titanium oxide will be more finely divided than the blanc fixe and will remain in suspension longer than said blanc fixe. Upon recoagulation of this mixture, the titanium oxide will be present in a different form that it was before peptization. When using such a mixture analyzing about 30% TiO₂ and about 70% blanc fixe, I am able to obtain an extended titanium pigment having properties somewhat different than the control pigment which was made without peptization. The strength and other properties are improved by virtue of peptization and the product is preferred to the normally treated pigment involving no peptization. Lesser but definite improvements in quality are obtained when treating previously calcined extended pigments in accordance with my herein described invention.

The prior art disadvantages enumerated herein as well as other obvious defects are obviated by practicing my herein invention. Further, the colloidal titanium oxide suspensions of this invention are very useful in the titanium pigment industry. By preparing a titanium oxide suspension in accordance with my process and mixing said suspension with other pigment materials such as barium sulfate, calcium sulfate, and the like, a titanium pigment having very useful properties is thereby produced. Additionally, the peptized titanium oxide suspension may be added to other titanium pigments coagulating the dispersed titanium oxide and the non-dispersed titanium oxide, thereby adjusting the particle size or greatness to any desired extent. In this manner, I may produce titanium oxide pigments of altered fineness and pigment properties.

These suspensions are exceedingly appropriate for use in the manufacture of an extended titanium pigment. A preferred procedure comprises mixing a suspension of blanc fixe or calcium sulfate with the colloidally dispersed titanium oxide in the preferred proportion, usually about 25% to about 30% TiO₂, thereafter coagulating the titanium oxide by processes indicated herein, filtering, drying, and calcining the composite pigment. In this manner, the composite pigment is a uniform product having the titanium dioxide thoroughly dispersed throughout the extender and immediately associated or coalesced with said extender.

As many apparently widely different embodiments of this invention may be made without departing from the spirit and scope thereof, it is to be understood that I do not limit myself to the specific embodiment thereof except as defined in the appended claims.

Having described the present invention the following is claimed as new and useful.

1. In a process for producing improved pigments the step which comprises peptizing a titanium oxide pigment with an oxygen containing monobasic compound selected from the class consisting of sulfamic acid, chloric acid, bromic acid, iodic acid, perchloric acid, perbromic acid, periodic acid, and the barium salts thereof.

2. In a process for producing improved pigments the steps which comprise peptizing a titanium oxide pigment with an oxygen containing monobasic compound selected from the class consisting of sulfamic acid, chloric acid, bromic acid, iodic acid, perchloric acid, perbromic acid, periodic acid, and the barium salts thereof, and subsequently coagulating the resulting colloidal suspension by decomposing the agent added thereto.

3. In a process for producing improved pigments the step which comprises peptizing a titanium oxide pigment with an oxygen containing monobasic compound selected from the class consisting of sulfamic acid chloric acid bromic acid, iodic acid, perchloric acid, perbromic acid, periodic acid, and the barium salts thereof, mixing the resulting colloidal suspension with an aqueous suspension containing an extender, and thereafter coagulating by decomposing the agent added thereto.

4. In a process for producing an improved pigment the step which comprises peptizing a titanium dioxide pigment with sulfamic acid and subsequently flocculating the resulting coloidal suspension by the application of heat.

5. In a process for producing an improved pigment the step which comprises peptizing a titanium dioxide pigment with barium sulfamate and subsequently flocculating the resulting colloidal suspension by the application of heat.

6. A colloidal suspension comprising titanium oxide an an oxygen containing monobasic compound selected from the class consisting of sulfamic acid, chloric acid, bromic acid, iodic acid, perchloric acid, perbromic acid, periodic acid, and the barium salts thereof.

7. A colloidal suspension which comprises titanium oxide, an extender, and an oxygen containing monobasic compound selected from the class consisting of sulfamic acid, chloric acid, bromic acid, iodic acid, perchloric acid, perbromic acid, periodic acid, and the barium salts thereof.

8. A colloidal suspension which comprises titanium dioxide and sulfamic acid.

9. In a process for producing an improved pigment the steps which comprise peptizing a titanium dioxide pigment with sulfamic acid and subsequently flocculating the resulting colloidal suspension by heating said solution at a temperature between about 80° C. and the boiling point of the solution.

10. In a process for producing an improved pigment the steps which comprise peptizing a titanium dioxide pigment with between about 0.5% and about 20%, based upon the TiO₂, of sulfamic acid, and subsequently flocculating the resulting colloidal suspension by heating said solution at a temperature between about 80° C. and the boiling point of the solution.

11. In a process for producing an improved pigment the steps which comprise peptizing a titanium dioxide pigment with barium sulfamate and subsequently flocculating the resulting colloidal suspension by heating said solution at a temperature between about 80° C. and the boiling point of the solution.

12. In a process for producing an improved pigment the steps which comprise peptizing a titanium dioxide pigment with between about 0.5% and about 20%, based upon the TiO₂, of barium sulfamate, and subsequently flocculating the resulting colloidal suspension by heating said solution at a temperature between about 80° C. and the boiling point of the solution.

13. In a process for producing an improved pigment the step which comprises peptizing a titanium dioxide pigment with sulfamic acid and subsequently coagulating the resulting colloidal suspension by decomposing the sulfamic acid added thereto.

IGNACE J. KRCHMA.